(12) United States Patent
Marugame (10) Patent No.: US 6,226,396 B1
(45) Date of Patent: May 1, 2001

(54) OBJECT EXTRACTION METHOD AND SYSTEM

(75) Inventor: Atsushi Marugame, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/127,446

(22) Filed: Jul. 31, 1998

(30) Foreign Application Priority Data

Jul. 31, 1997 (JP) .................................................... 9-206223

(51) Int. Cl.$^7$ ........................................................ G06K 9/00
(52) U.S. Cl. .......................... 382/154; 382/190; 345/419
(58) Field of Search ................................. 382/151, 154, 382/190, 192, 193, 195, 199, 201, 203, 206, 291; 345/139, 418, 419, 425; 356/12; 364/559

(56) References Cited

U.S. PATENT DOCUMENTS

| | | | |
|---|---|---|---|
| 4,654,872 | * 3/1987 | Hisano et al. | 382/154 |
| 5,432,712 | * 7/1995 | Chan | 382/191 |
| 5,867,591 | * 2/1999 | Onda | 382/154 |

FOREIGN PATENT DOCUMENTS

| | | | |
|---|---|---|---|
| 735512A2 | * 10/1996 | (EP) . | |
| 62-3585 | * 1/1987 | (JP) . | |
| 7-287764 | * 10/1995 | (JP) . | |
| 9-81746 | 3/1997 | (JP) . | |
| 10-98646 | 4/1998 | (JP) . | |

OTHER PUBLICATIONS

Dmitry Novik, "Streo Images Data Compression & Digital Stereo Compatible TV", SPIE Proceedings, Visual Information Processing V, vol. 2753 pp. 1–10, 1996.*

* cited by examiner

Primary Examiner—Amelia Au
Assistant Examiner—Samir Ahmed
(74) Attorney, Agent, or Firm—Scully, Scott, Murphy & Presser (57) ABSTRACT

In an image processing system having a primary image pickup device and a plurality of reference image pickup devices, a feature region consisting of a plurality of feature segments each defined by a pair of feature points is extracted from a primary image. Subsequently, a correspondence point candidate of each of the feature points is extracted from each of the reference images. Based on the feature points and the correspondence point candidate of each of the feature points for each of the reference images, three-dimensional coordinates corresponding to the feature points are calculated, and the feature region is extracted as a target object from the primary image based on the feature points and the three-dimensional coordinates corresponding to the feature points for each of the reference images.

18 Claims, 8 Drawing Sheets

OBJECT EXTRACTION METHOD AND SYSTEM

BACKGROUND OF THE INVENTION

1. Field of the Invention

The present invention generally relates to an image data processing system, and in particular to method and system which extracts a target object from an image.

2. Description of the Related Art

There have been proposed several object extraction techniques, for instance, using necessary information which is previously registered, using well-known focusing technology, and using plural image pick-up devices which are arranged in predetermined positional relationship.

According to the technique using the prepared necessary information, when no information can be prepared, the target object cannot be extracted. Further, an expensive distance-measuring device is needed to measure a distance from the principal point in the object side to a part of the object. Furthermore, a distance from the principal point in the image side to the image can be measured using auto-focusing mechanism, but the auto-focusing cannot always operate stably depending on illumination conditions, resulting in reduced reliable measurement.

According to the technique using the focusing technology, an image pickup device images a target object while varying the focal length. Therefore, it is necessary to place the target object within the focal depth.

The technique using plural image pickup devices has been disclosed in Japanese Patent Unexamined Publication No. 10-98646. According to this conventional technique, the target object can be extracted using the three-dimensional coordinates of the contour of the target object. The three-dimensional coordinates of the target object are obtained on the principal of triangulation by using two-dimensional feature points and their point correspondence between the images which are obtained by two image pickup devices, respectively. The technique can provide stable operation without the need of information regarding the target object and with little influence of illumination conditions.

However, the precision of target extraction largely depends on a threshold used to discriminate between the target object and the background and it is difficult to properly determine such a threshold. According the Publication (No. 10-98646), the threshold is determined through human eyes and further the system is not designed to extract two or more target objects but a single object.

SUMMARY OF THE INVENTION

An object of the present invention is to provide object extraction system and method which can extract a target object from an image with precision and stability.

Another object of the present invention is to provide object extraction system and method which can determine a threshold used to discriminate between a target object and its background of an image.

Still another object of the present invention is to provide object extraction system and method which can extract a plurality of target objects from an image.

According to an aspect of the present invention, a first image (e.g. a primary image) and a plurality of second images (e.g. reference images) are generated through a first image pickup device and a plurality of second image pickup devices, respectively, and then a feature region is extracted from the first image, the feature region consisting of a plurality of feature segments each defined by a pair of adjoining feature points. Subsequently, a correspondence point candidate of each of the feature points is extracted from each of the second images. Based on the feature points and the correspondence point candidate of each of the feature points for each of the second images, three-dimensional coordinates corresponding to the feature points are calculated, and the feature region is extracted as a target object from the first image based on the feature points and the three-dimensional coordinates corresponding to the feature points for each of the second images.

The feature region may be extracted according to the following steps: determining point correspondence between the first image and each of the second images using the three-dimensional coordinates for each of the second images; calculating a length difference between a distance of adjoining feature points in the first image and that of their corresponding points in each of the second images; calculating disparities between the feature points in the first image and their corresponding points in the second images; and then extracting the feature region as the target object from the first image when both the length segment length difference and the disparity fall into a segment length difference range and a disparity range, respectively.

According to another aspect of the present invention, the feature region may be extracted according to the following steps: generating the segment length difference range depending on a first distribution of the number of points included in the feature region with respect to the length segment length difference (length difference distribution); generating the disparity range depending on a second distribution of the number of points included in the feature region with respect to the disparity (disparity distribution); and then extracting the feature region as the target object from the first image when both the length difference and the disparity fall into the segment length difference range and the disparity range, respectively.

The feature region may be extracted as the target object from the first image in at least one of the respective cases where the length difference falls into the segment length difference range and where the disparity falls into the disparity range.

The length difference range may be a range where the length difference distribution is larger than a first predetermined threshold level. The disparity range may be a range where the disparity distribution is larger than a second predetermined threshold level. In the case where a plurality of ranges where the disparity distribution is larger than the second predetermined threshold level are detected, a range corresponding to a maximum disparity may be determined to be the disparity range.

DETAILED DESCRIPTION OF THE PREFERRED EMBODIMENTS

Figure 1:
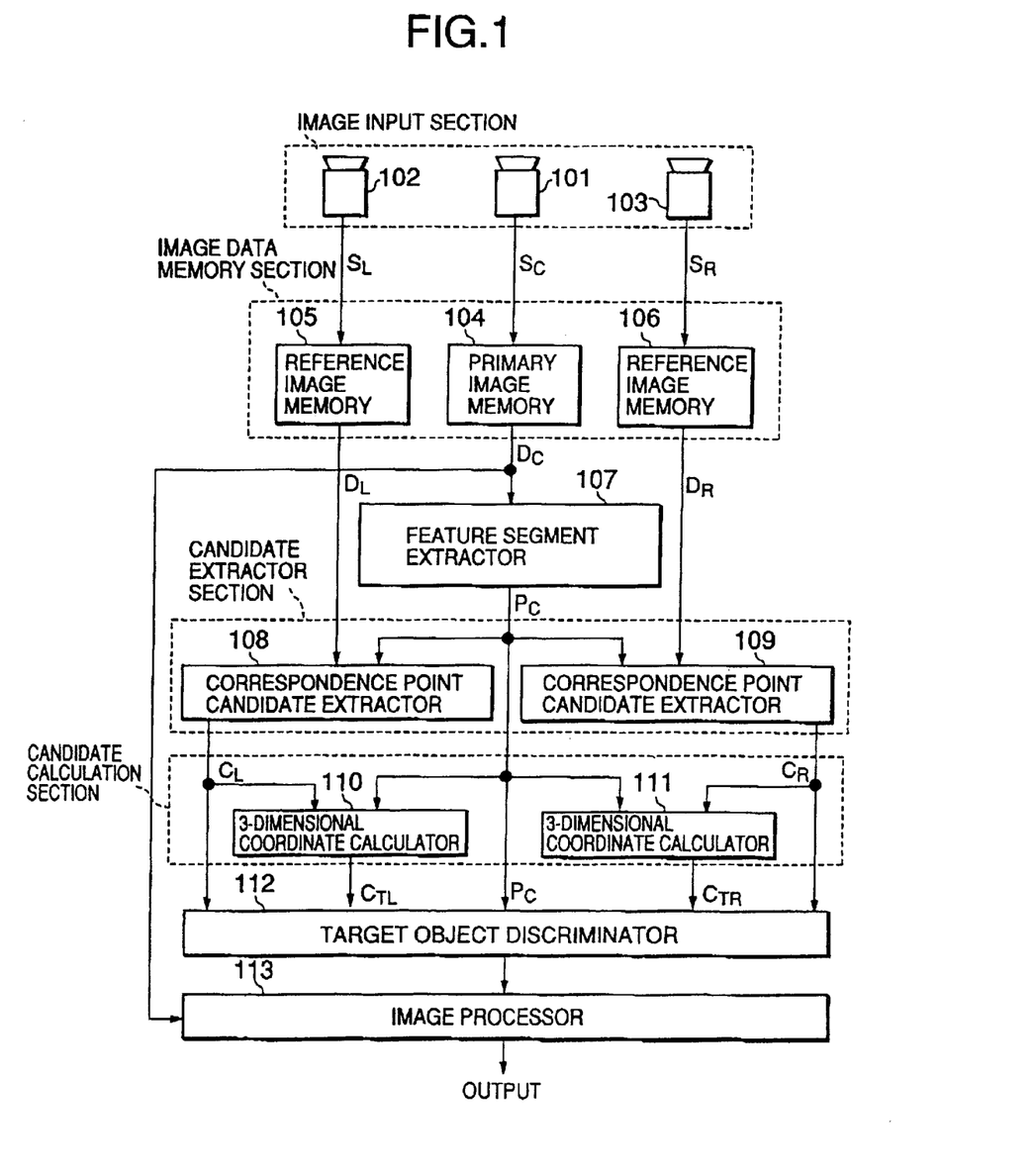
FIG. 1 is a block diagram showing an image data processing system employing a target object extraction system according to a first embodiment of the present invention.

Referring to FIG. 1, the image data processing system is provided with three image pickup devices 101–103 whose positional orientations are calibrated with a shape-known object, for example, a horizontal plane where the image pickup device 101 is positioned between the image pickup devices 102 and 103. The image pickup device 101 produces a primary image data $S_C$ and the image pickup devices 102 and 103 produce reference image data $S_L$ and $S_R$, respectively. The image pickup devices 101–103 may be implemented with a CCD (charge coupled device) camera. The primary image data $S_C$ is stored onto a primary image memory 104 and the reference image data $S_L$ and $S_R$ are stored onto reference image memories 105 and 106, respectively.

Primary image data $D_C$ is output from the primary image memory 104 to a feature segment extractor 107. Left and right reference image data $D_L$ and $D_R$ are output to correspondence point candidate extractor 108 and 109, respectively. The feature segment extractor 107 extracts a feature segment between a pair of adjoining feature points $P_{C1}$ and $P_{C2}$ on each horizontal line of the primary image to produce feature segment data $P_C$. The extracted feature segments are numbered and stored. In the case where a plurality of feature segments are found on a horizontal line, those feature segments are numbered from left to right and stored.

The correspondence point candidate extractor 108 inputs the left reference image data $D_L$ from the left reference image memory 105 and the feature segment data $P_C$ to produce the left correspondence point candidate data $C_L$ which includes correspondence points $C_{L1}$ and $C_{L2}$ on the left image corresponding to the feature points $P_{C1}$ and $P_{C2}$.

The correspondence point candidate extractor 109 inputs the right reference image data $D_R$ from the right reference image memory 106 and the feature segment data $P_C$ to produce the right correspondence point candidate data $C_R$ which includes correspondence points $C_{R1}$ and $C_{R2}$ on the right image corresponding to the feature points $P_{C1}$ and $P_{C2}$. The details will be described later (see FIGS. 4, 5A, 5B, 6A, and 6B).

The image data processing system is further provided with left and right three-dimensional coordinate calculators 110 and 111. The left three-dimensional coordinate calculator 110 inputs the feature segment data $P_C$ and the correspondence point candidate data $C_L$ to calculate the three-dimensional coordinate data $C_{TL}$ for the correspondence point candidates on the left image using the positional relationship of the image pickup devices 101–103 based on the well-known principal of triangulation. Similarly, the right three-dimensional coordinate calculator 111 inputs the feature segment data $P_C$ and the correspondence point candidate data $C_R$ to calculate the three-dimensional coordinate data $C_{TR}$ of the object for the correspondence point candidates on the right image using the positional relationship of the image pickup devices 101–103 based on the well-known principal of triangulation.

In this manner, the left and right three-dimensional coordinate data $C_{TL}$ and $C_{TR}$ are generated and labeled with the correspondence point candidate data $C_R$ and $C_R$, respectively. The respective three-dimensional coordinate data $C_{TL}$ and $C_{TR}$ labeled with $C_R$ and $C_R$ together with the feature segment data $P_C$ are output to a target object discriminator 112. As described later, the target object discriminator 112 discriminates between the target object and its background. According to the target object discrimination, an image processor 113 processes the primary image data $D_C$.

Figure 2:
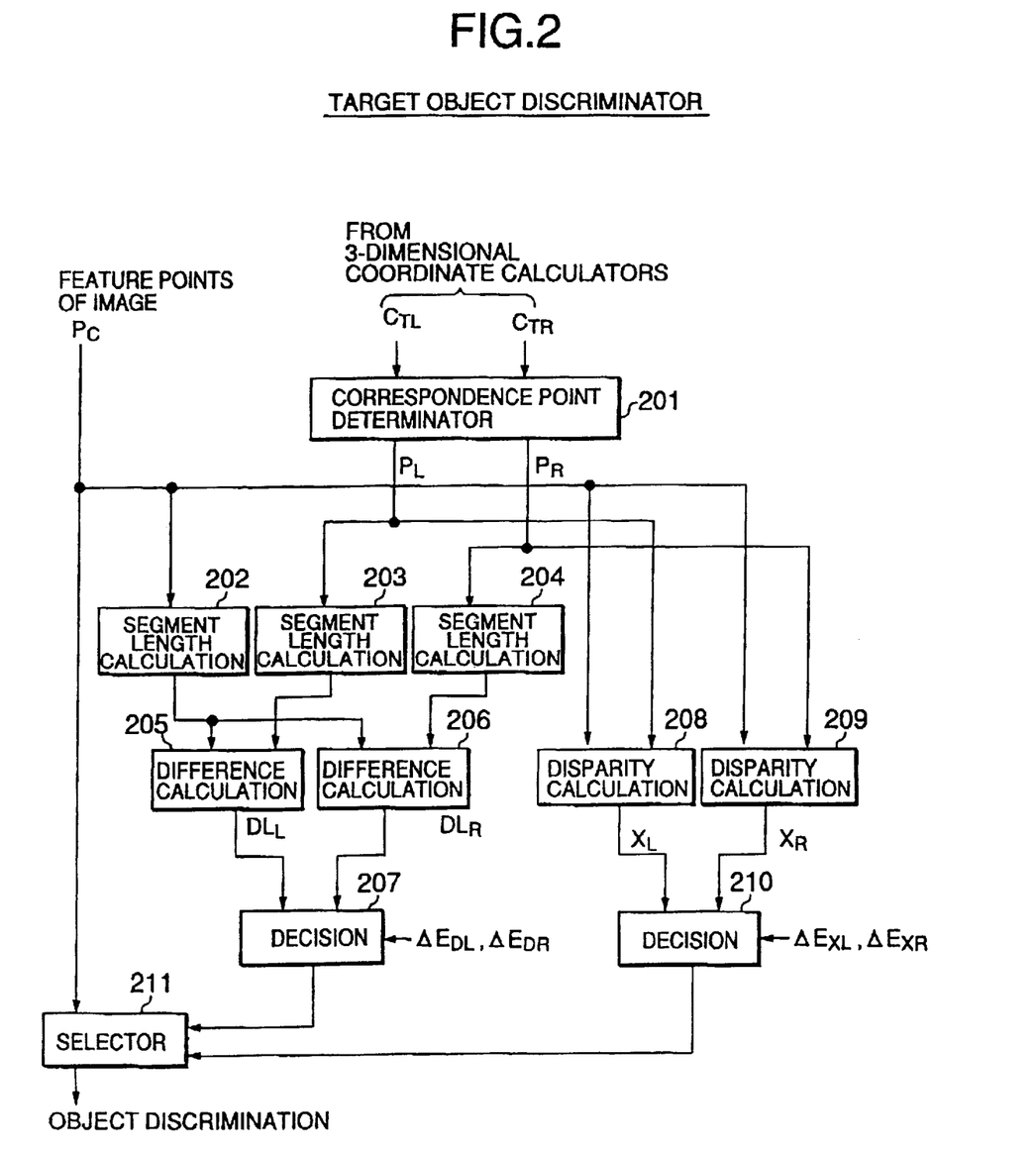
FIG. 2 is a block diagram showing a target object extraction system according to the first embodiment.

Referring to FIG. 2, the target object discriminator 112 includes a correspondence point determination section 201, a distance comparison section, a disparity calculation section and a decision section.

The correspondence point determination section 201 inputs the left and right three-dimensional coordinate data $C_{TL}$ and $CT_{TR}$ to produce correspondence point data $P_L$ on the left image and correspondence point data $P_R$ on the right image. More specifically, the correspondence point determination section 201 calculates all possible distances between the counterparts of the left and right three-dimensional coordinate data $C_{TL}$ and $C_{TR}$. From the calculated distances, a pair of points having the minimum distance are selected as the correspondence points, as will be described later.

The segment length comparison section compares a distance between the adjoining feature points to that of the determined correspondence points. The distance comparison section is comprised of segment length calculators 202–204, difference calculators 205 and 206, and a decision section 207. The segment length calculator 202 inputs the feature segment data $P_C$ to calculate a distance between the feature points on each horizontal line. The segment length calculator 203 inputs the correspondence point data $P_L$ to calculate a distance between the correspondence points of the adjoining feature points on the left reference image. The segment length calculator 204 inputs the correspondence point data $P_R$ to calculate a distance between the correspondence points of the adjoining feature points on the right reference image. The difference calculator 205 inputs the respective outputs of the segment length calculators 202 and 203 to produce a left segment length difference $DL_L$ between a distance of the adjoining feature points and that of the correspondence points of the left reference image. Similarly, the difference calculator 206 inputs the respective outputs of the segment length calculators 202 and 204 to produce a right segment length difference $DL_R$ between the distance of the adjoining feature points and that of the correspondence points of the right reference image. The decision section 207 decides whether the left segment length difference $DL_L$ and the right segment length difference $DL_R$ fall into permissible ranges of $\Delta E_{DL}$ and $\Delta E_{DR}$, respectively.

The disparity calculation section is comprised of disparity calculators 208 and 209 and a decision section 210. The disparity calculator 208 inputs the feature segment data $P_C$ and the correspondence point data $P_L$ to calculate left disparity $X_L$. The disparity calculator 209 inputs the feature segment data $P_C$ and the correspondence point data $P_R$ to calculate right disparity $X_R$. The decision section 210 decides whether the left and right disparity $X_L$ and $W_R$ fall into permissible ranges of $\Delta E_{XT}$ and $\Delta E_{XR}$, respectively.

The respective decision sections 207 and 210 output decision results to a selector 211 which selects feature points for object discrimination from the feature segment data $P_C$ depending on the decision results. More specifically, in the case where both segment length difference and disparity fall into the permissible ranges, the selector 211 selects the corresponding feature points as the object discrimination data.

Correspondence Point Candidate Extraction

Figure 3:
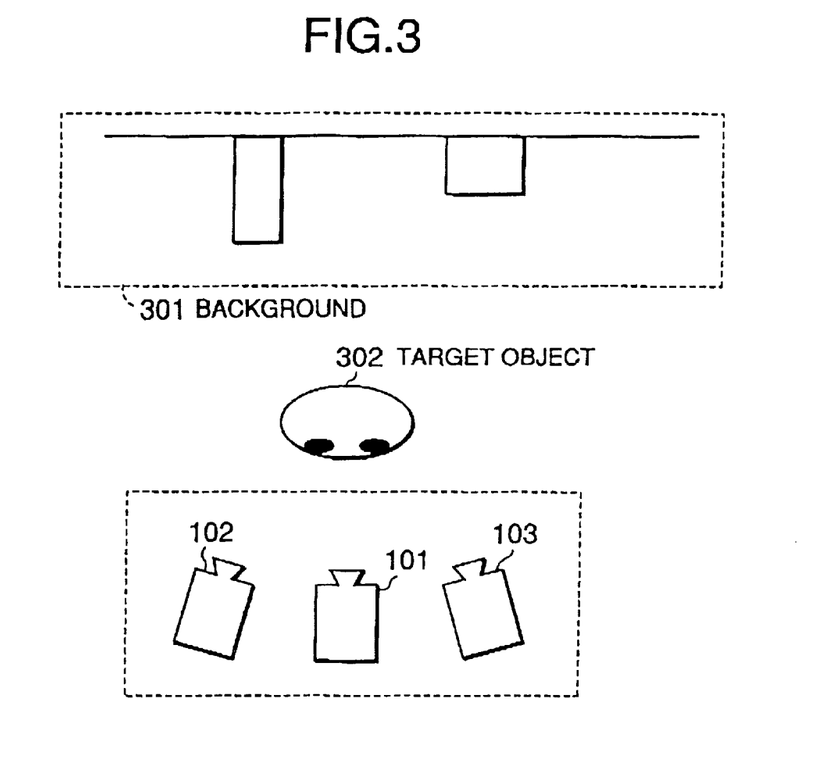
FIG. 3 is a schematic diagram showing an example of the positional relationship of the image data processing system, the target object and its background.

For simplicity, consider a situation as shown in FIG. 3. A target object 302 is placed in front of the background 301 and the image input section consisting of the image pickup devices 101–103 is pointed at the target object 302.

Figure 4:
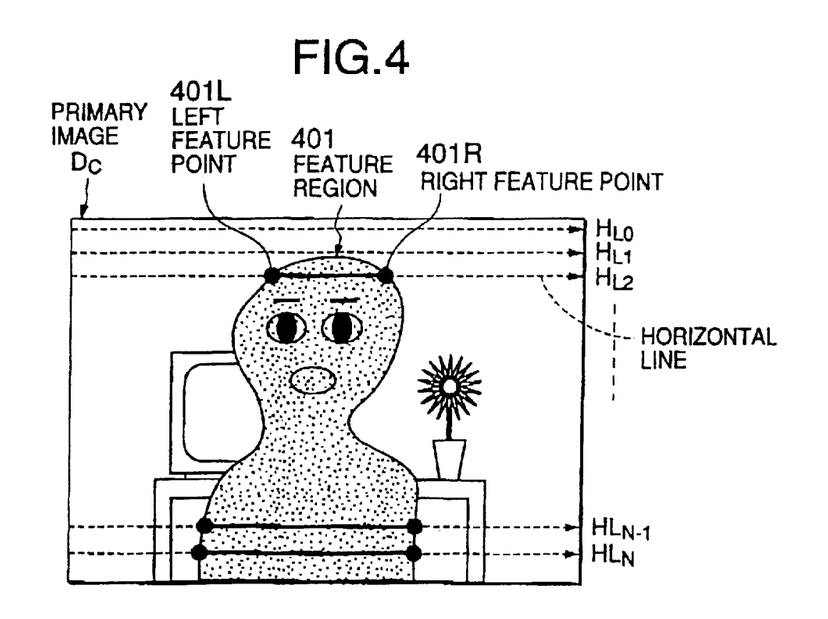
FIG. 4 is a schematic diagram showing a primary image obtained by a primary image pickup device of the image data processing system.
Figure 5A:
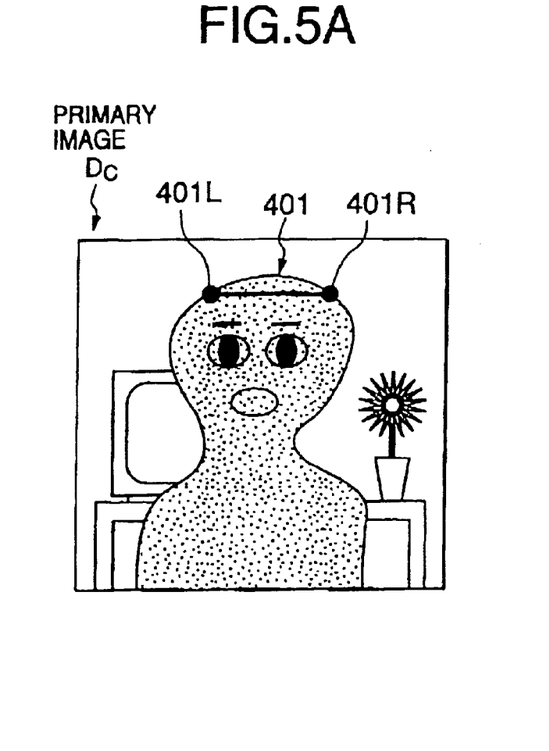
FIG. 5A is a schematic diagram showing the primary image for explanation of correspondence operation performed by the image data processing system.

As shown in FIGS. 4 and 5A, assuming that the primary image memory 104 stores a primary image consisting of N horizontal lines where the target object 302 is indicated by feature region 401 on the primary image and the left and right feature points of each feature segment are indicated by reference numeral 401L and 401R. In this figure, only a feature segment on the second horizontal line $HL_1$ is shown.

Figure 5B:
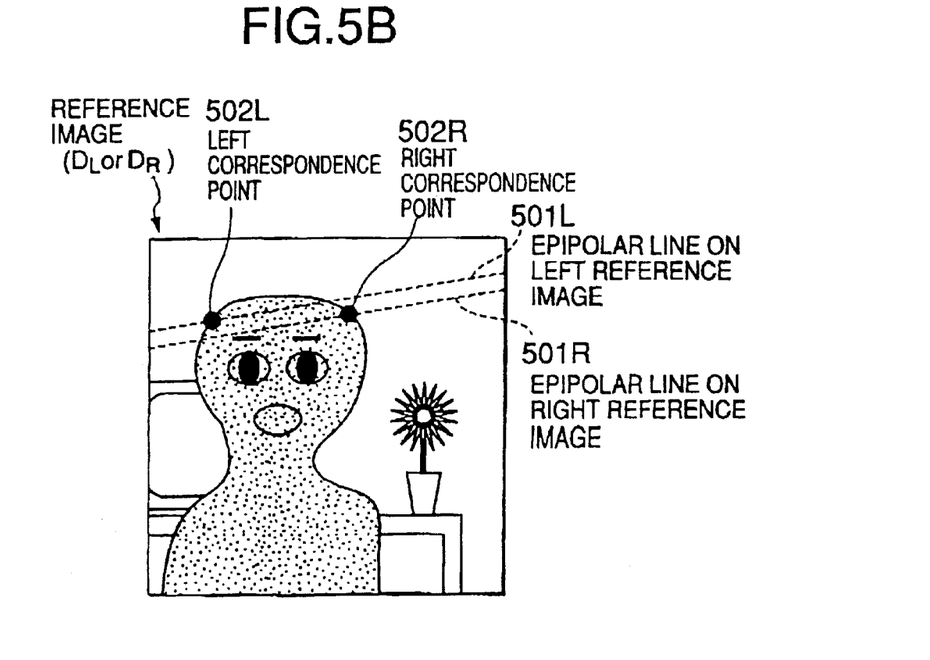
FIG. 5B is a schematic diagram showing reference images for explanation of correspondence operation performed by the image data processing system.

As shown in FIG. 5B, epipolar lines 501L and 501R are obtained respectively on the left and right reference images using the well-known algorithm in the case where the positional relationship of the image pickup devices 101–103 is previously defined. The horizontal line may be used as an epipolar line in the case where the image pickup devices 101–103 are properly arranged. In the case where the positional relationship of the image pickup devices 101–103 is not defined, they can be calculated from the image of a predetermined pattern as described in the Publication (No. 10-98646).

When the respective epipolar lines 501L and 501R have been determined on the left and right reference images, a search is made on the epipolar lines 501L and 501R for correspondence point candidates of the feature points 401L and 401R on the primary image, respectively. In this case, to simplify the calculation for searching for correspondence point candidates, one-side block matching method is employed, which will be described hereinafter.

Consider that a correspondence point candidate of a feature point is found on an epipolar line. If the feature point is located in the left side of the primary image, then the correspondence point candidate extractor performs the right-side block matching operation. Contrarily, if the feature point is located in the right side of the primary image, then the correspondence point candidate extractor performs the left-side block matching operation.

Figure 6A:
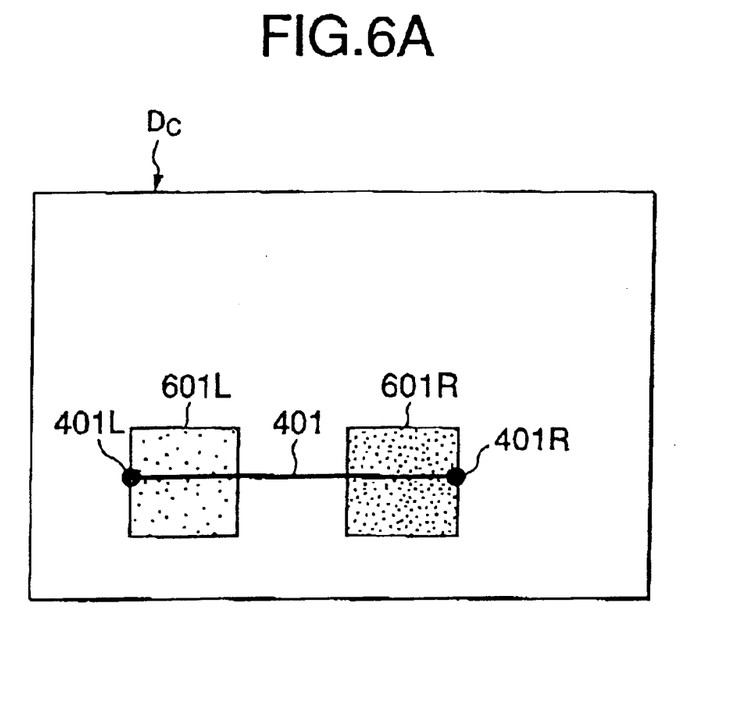
FIG. 6A is a schematic diagram showing the primary image for explanation of the block matching operation performed by the image data processing system.
Figure 6B:
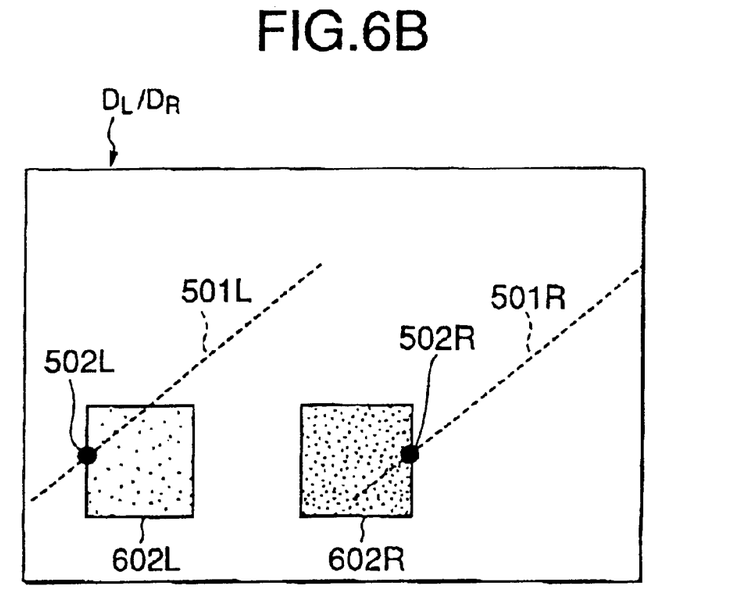
FIG. 6B is a schematic diagram showing reference images for explanation of the block matching operation performed by the image data processing system.

As shown in FIGS. 6A and 6B, when the correspondence point candidate 502L of the feature point 401L is found on the epipolar line 501L, the respective blocks 601L and 602L in the right sides of the feature point 401L and the correspondence point 502L are taken to be subjected to the right-side block matching. More specifically, the correspondence point candidate extractor 108 calculates a block error of color and luminance between the blocks 601L and 602L.

Similarly, when the correspondence point candidate 502R of the feature point 401R is found on the epipolar line 501R, the respective blocks 601R and 602R in the left sides of the feature point 401R and the correspondence point 502R are taken to be subjected to the left-side block matching. More specifically, the correspondence point candidate extractor 109 calculates a block error of color and luminance between the blocks 601R and 602R.

Subsequently, the respective correspondence point candidate extractors 108 and 109 determine whether the calculated block error is smaller than a predetermined threshold. If the calculated block error is not smaller than the predetermined threshold, control goes back to the corresponding point searching step. If the calculated block error is smaller than the predetermined threshold, the point found on the epipolar line is determined to be a correspondence point candidate.

Three-Dimensional Coordinate Calculation

As described before, the three-dimensional coordinate calculator 110 calculates the three-dimensional coordinate data $C_{TL}$ for the left reference image based on the well-known principal of triangulation. The three-dimensional coordinate data $C_{TL}$ includes first and second candidates $C_{TL1}$ and $C_{TL2}$ corresponding to the adjoining feature points $P_{C1}$ and $P_{C2}$, respectively. More specifically, when receiving the feature points $P_{C1}$ and $P_{C2}$ forming the feature segment on the primary image and the correspondence point candidates $C_{L1}$ and $C_{L2}$ on the left reference image, the three-dimensional coordinate calculator 110 uses the principal of triangulation and the positional relationship of the image pickup devices 101–103 to calculate the three-dimensional coordinates of the first and second candidates $C_{TL1}=(X^{L1}_M, Y^{L1}_M, Z^{L1}_M)$ and $C_{TL2}=(X^{L2}_M, Y^{L2}_M, Z^{L2}_M)$ (M=1, 2, ...) for the feature points $P_{C1}$ and $P_{C2}$, respectively.

Similarly, the three-dimensional coordinate calculator 111 calculates the right three-dimensional coordinate data $C_{TR}$ based on the well-known principal of triangulation. More specifically, when receiving the feature points $P_{C1}$ and $P_{C2}$ on the primary image and the correspondence point candidates $C_{R1}$ and $C_{R2}$ on the right reference image, the three-dimensional coordinate calculator 111 uses the principal of triangulation and the positional relationship of the image pickup devices 101–103 to calculate the three-dimensional coordinates of the first and second candidates $C_{TR1}=(X^{R1}_N, Y^{R1}_N, Z^{R1}_N)$ and $C_{TR2}=(X^{R2}_N, Y^{R2}_N, Z^{R2}_N)$ (N=1, 2, ...) for the feature points $P_{C1}$ and $P_{C2}$, respectively.

In this manner, the left three-dimensional coordinate data $C_{TL}$ including point candidates $C_{TL1}$ and $C_{TL2}$ and the right three-dimensional coordinate data $C_{TR}$ including point candidates $C_{TR1}$ and $C_{TR2}$ are obtained based on the primary image and the left and right reference images, and using these three-dimensional coordinates, the correspondence point determination section 201 determines the correspondence point coordinates.

Correspondence Point Determination

The correspondence point determination section 201 inputs the first and second three-dimensional coordinate data $C_{TL}$ and $C_{TR}$, that is, $C_{TL1}=(X^{L1}_M, Y^{L1}_M, Z^{L1}_M)$, $C_{TL2}=$ $(X^{L2}{}_M, Y^{L2}{}_M, Z^{L2}{}_M)$ and $C_{TR1}=(X^{R1}{}_N, Y^{R1}{}_N, Z^{R1}{}_N)$ and $C_{TR2}=(X^{R2}{}_N, Y^{R2}{}_N, Z^{R2}{}_N)$ to calculate a distance between the corresponding points of the left and right three-dimensional coordinate data $C_{TL}$ and $C_{TR}$. Then a pair of points having the minimum distance is selected from the calculated distances.

More specifically, a first distance $d_{MN1}$ is calculated for each of all the combinations of the coordinates $C_{TL1}=(X^{L1}{}_M, Y^{L1}{}_M, Z^{L1}{}_M)$ and $C_{TR1}=(X^{R1}{}_N, Y^{R1}{}_N, Z^{R1}{}_N)$ by the following equation:

$$d_{MN}{}^2 = (X^{L1}{}_M - X^{R1}{}_N)^2 + (Y^{L1}{}_M - Y^{R1}{}_N)^2 + (Z^{L1}{}_M - Z^{R1}{}_N)^2.$$

Alternatively, the following equation may be used:

$$d_{MN} = |X^{L1}{}_M - X^{R1}{}_N| + |Y^{L1}{}_M - Y^{R1}{}_N| + |Z^{L1}{}_M - Z^{R1}{}_N|.$$

Further more specifically, the first distance $d_{MN1}$ is obtained for each of all the combinations of the coordinates $C_{TL1}=(X^{L1}{}_M, Y^{L1}{}_M, Z^{L1}{}_M)$ and $C_{TR1}=(X^{R1}{}_N, Y^{R1}{}_N, Z^{R1}{}_N)$ as shown in the following table as an example.

TABLE

|  | $C_{TL(M=1)}$ | $C_{TL(M=2)}$ | $C_{TL(M=3)}$ | $C_{TL(M=4)}$ | $C_{TL(M=5)}$ | ... |
|---|---|---|---|---|---|---|
| $C_{TR(N=1)}$ | 0.038 | 0.025 | 0.048 | 0.0075 | 0.031 | ... |
| $C_{TR(N=2)}$ | 0.0020 | 0.0043 | 0.0023 | 0.0052 | 0.024 | ... |
| $C_{TR(N=3)}$ | 0.0024 | 0.00011 | 0.0035 | 0.0058 | 0.0079 | ... |
| $C_{TR(N=4)}$ | 0.0026 | 0.0063 | 0.0051 | 0.017 | 0.015 | ... |
| $C_{TR(N=5)}$ | 0.0084 | 0.047 | 0.068 | 0.028 | 0.040 | ... |
| ... | ... | ... | ... | ... | ... | ... |

Subsequently, the correspondence point determination section 201 selects the minimum distance $d_{I1}$ and produces the correspondence point $P_{L1}=(X^{L1}{}_{I1}, Y^{L1}{}_{I1}, Z^{L1}{}_{I1})$ and $P_{R1}=(X^{R1}{}_{J1}, Y^{R1}{}_{J1}, Z^{R1}{}_{J1})$ for the minimum distance $d_{J1}$.

Similarly, a second distance $d_{MN2}$ is calculated for each of all the combinations of the coordinates $C_{TL2}=(X^{L2}{}_M, Y^{L2}{}_M, Z^{L2}{}_M)$ and $C_{TR2}=(X^{R2}{}_N, Y^{R2}{}_N, Z^{R2}{}_N)$ and the minimum distance $d_{I2}$ is selected to produce the correspondence point $P_{L2}=(X^{L2}{}_{I2}, Y^{L2}{}_{I2}, Z^{L2}{}_{I2})$ and $P_{R2}=(X^{R2}{}_{J2}, Y^{R2}{}_{J2}, Z^{R2}{}_{J2})$.

In this manner, the correspondence points $P_{L1}=(X^{L1}{}_{I1}, Y^{L1}{}_{I1}, Z^{L1}{}_{I1})$ and $P_{L2}=(X^{L2}{}_{I2}, Y^{L2}{}_{I2}, Z^{L2}{}_{I2})$ on the left reference image and the correspondence points $P_{R1}=(X^{R1}{}_{J1}, Y^{R1}{}_{J1}, Z^{R1}{}_{J1})$ and $P_{R2}=(X^{R2}{}_{J2}, Y^{R2}{}_{J2}, Z^{R2}{}_{J2})$ on the right reference image are obtained. The correspondence points $P_{L1}$ and $P_{L2}$ are output as correspondence point data $P_L$ to the segment length calculator 203 and the disparity calculator 208. The correspondence points $P_{R1}$ and $P_{R2}$ are output as correspondence point data $P_R$ to the segment length calculator 204 and the disparity calculator 209.

Segment Length Difference Check

The segment length calculator 202 calculates a length of the feature segment data $P_C$. The segment length calculator 203 inputs the corresponding segment data $P_L$ and calculates its length. Similarly, the segment length calculator 204 inputs the correspondence point data $P_R$ and calculate its length.

The difference calculator 205 inputs the respective outputs of the segment length calculators 202 and 203 to produce a left segment length difference $DL_L$ between a length of a segment in the primary image and that of the corresponding segment on the left reference image. Similarly, the difference calculator 206 inputs the respective outputs of the segment length calculators 202 and 204 to produce a right segment length difference $DL_R$ between a length of a segment in the primary image and that of the corresponding segment on the right reference image. The decision section 207 decides whether the left segment length difference $DL_L$ and the right segment length difference $DL_R$ fall into permissible ranges of $\Delta E_{DL}$ and $\Delta E_{DR}$, respectively.

Disparity Check

The disparity calculator 208 inputs the feature segment data $P_C$ and the respective correspondence points on the left reference image corresponding to the left three-dimensional coordinates $P_{L1}=(X^{L1}{}_{I1}, Y^{L1}{}_{I1}, Z^{L1}{}_{I1})$ and $P_{L2}=(X^{L2}{}_{I2}, Y^{L2}{}_{I2}, Z^{L2}{}_{I2})$ and calculates left disparity $X_L$. The disparity calculator 209 inputs the feature segment data $P_C$ and the respective correspondence points on the right reference image corresponding to the right three-dimensional coordinates $P_{R1}=(X^{R1}{}_{J1}, Y^{R1}{}_{J1}, Z^{R1}{}_{J1})$ and $P_{R2}=(X^{R2}{}_{J2}, Y^{R2}{}_{J2}, Z^{R2}{}_{J2})$ and calculates right disparity $X_R$. The decision section 210 decides whether the left and right disparities $X_L$ and $X_R$ fall into permissible ranges of $\Delta E_{XL}$ and $\Delta E_{XR}$, respectively.

Decision and Selection

If the left segment length difference $DL_L$ and the right segment length difference $DL_R$ fall into permissible ranges of $\Delta E_{DL}$ and $\Delta E_{DR}$, respectively, then the decision section 207 decides that the feature segment data $P_C$ is included in the feature region 401 as shown in FIG. 4. Further, if the left and right disparities $X_L$ and $X_R$ fall into permissible ranges of $\Delta E_{XL}$ and $\Delta E_{XR}$, respectively, then the decision section 210 decides that the feature segment data $P_C$ is included in the feature region 401. The selector 211 selects feature points for object discrimination from the feature segment data $P_C$ depending on whether the decision results of the decision sections 207 and 210 are both acceptable.

Therefore, in the case where the respective segment length differences $DL_L$ and $DL_R$ fall into permissible ranges of $\Delta E_{XL}$ and $\Delta E_{XR}$ and at the same time the respective disparities $X_L$ and $X_R$ fall into permissible ranges of $\Delta E_{XL}$ and $\Delta E_{XR}$, the corresponding feature segment is selected as the object discrimination data. In other words, it is determined that the corresponding feature segment is included in the target object on the primary image.

The corresponding feature segment may be also selected as the object discrimination data when the respective segment length differences $DL_L$ and $DL_R$ fall into permissible ranges of $\Delta E_{XL}$ and $\Delta E_{XR}$ or when the respective disparities $X_L$ and $X_R$ fall into permissible ranges of $\Delta E_{XL}$ and $\Delta E_{XR}$.

As described above, the object determination is performed and used to extract the feature region 401, that is, the target object from the primary image data $D_C$. The left and right three-dimensional coordinate data $C_{TL}$ and $C_{TR}$ of the correspondence point candidates are obtained using a single primary image and two reference images based on the principal of triangulation. Thereafter, all the possible distances between the counterparts of first and second coordinates of the left and right three-dimensional coordinate data $C_{TL}$ and $C_{TR}$ and then from the calculated distances a pair of points having the minimum distance are selected as the correspondence points for each reference image. Therefore, the object determination is performed without the need of preparing information regarding the object.

Since redundant information can be obtained from the primary image and two reference images, the object determination is stably and reliably performed even in the case of variations of illumination conditions. Further, since detection of a feature segment starts the object determination, a plurality of objects can be extracted easily. Furthermore, since at least one of the segment length difference check and the disparity check determines whether the correspondence point determination is acceptable, the object determination is performed with precision.

Second Embodiment

In the target object discriminator 112, the permissible ranges of $\Delta E_{DL}$ and $\Delta E_{DR}$ for segment length difference check and the permissible ranges of $\Delta E_{XL}$ and $\Delta E_{XR}$ for disparity check may be generated with adaptive threshold. The details will be described hereinafter.

Figure 7:
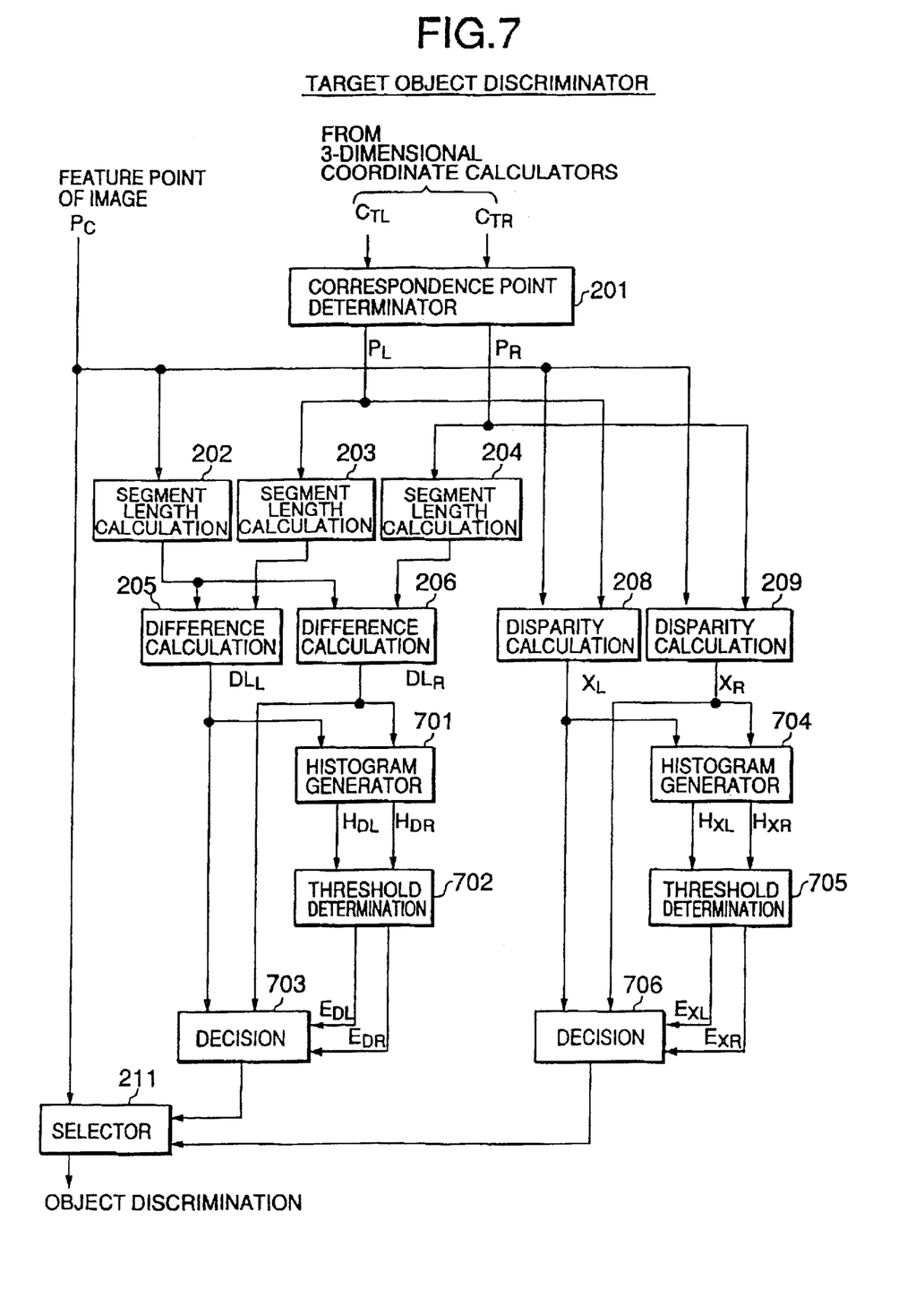
FIG. 7 is a block diagram showing a target object extraction system according to a second embodiment of the present invention.

Referring to FIG. 7, there is shown a target object discriminator 112 according to the second embodiment of the present invention, where circuit blocks similar to those previously described with reference to FIG. 2 are denoted by the same reference numerals and the descriptions of the circuit blocks are omitted.

The segment length check section is comprised of the segment length calculators 202–204 and the difference calculators 205 and 206 and is further comprised of a histogram generator 701, a threshold determination section 702 and a decision section 703. The difference calculator 205 produces the left segment length difference $DL_L$ between a length of a segment in the primary image and that of the corresponding segment in the left reference image. Similarly, the difference calculator 206 produces the right segment length difference $DL_R$ between a length of a segment in the primary image and that of the corresponding segment in the right reference image.

The histogram generator 701 inputs the left segment length difference $DL_L$ and the right segment length difference $DL_R$ from the difference calculators 205 and 206 and generates left histogram $H_{DL}$ and right histogram $H_{DR}$ of feature region 401 on the primary image with respect to segment length difference. Based on the respective histograms $H_{DL}$ and $H_{DR}$, the threshold determination section 702 generates left threshold date $E_{DL}$ including upper limit $E_{DL-U}$ and lower limit $E_{DL-L}$ and right threshold data $E_{DR}$ including upper limit $E_{DR-U}$ and lower limit $E_{DR-L}$. The decision section 703 decides whether the left segment length difference $DL_L$ and the right segment length difference $DL_R$ fall into the permissible ranges of $\Delta E_{DL}$ and $\Delta E_{DR}$ which are defined by the left threshold data $E_{DL}$ and the right threshold data $E_{DR}$, respectively.

The disparity calculation section is comprised of a histogram generator 704, a threshold determination section 705 and a decision section 706 in addition to the disparity calculators 208 and 209. The disparity calculator 208 and 209 calculate the left disparity $X_L$ and the right disparity $X_R$.

The disparity histogram generator 703 inputs the left disparity $X_L$ and the right disparity $X_R$ from the disparity calculators 208 and 209 and generates left disparity histogram $H_{XL}$ and right disparity histogram $H_{XR}$. Based on the respective disparity histograms $H_{XL}$ and $H_{XR}$, the threshold determination section 705 generates left disparity threshold date $E_{XL}$ including upper limit $E_{EL-U}$ and lower limit $E_{XL-L}$ and right disparity threshold data $E_{XR}$ including upper limit $E_{XR-U}$ and lower limit $E_{XR-L}$. The decision section 706 decides whether the left disparity $X_L$ and the right disparity $X_R$ fall into the permissible ranges of $\Delta E_{XL}$ and $\Delta E_{XR}$ which are defined by the left disparity threshold date $E_{XL}$ and the right disparity threshold data $E_{XR}$, respectively.

Segment Length Difference Threshold Determination

Figure 8A:
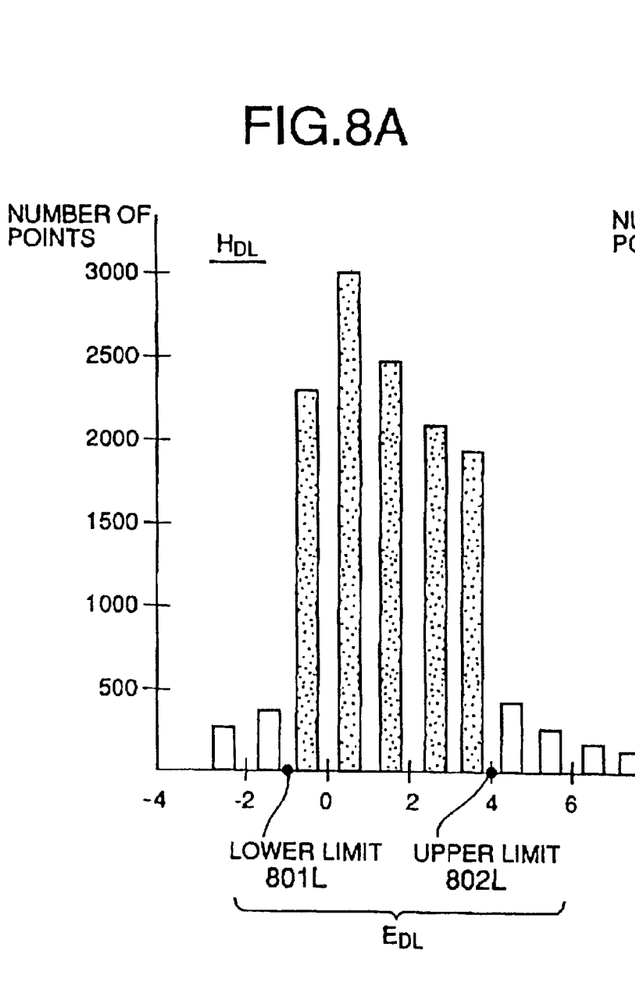
FIG. 8A is a diagram showing a histogram of length variations in the primary and left reference images for explanation of a left-side length variation threshold in the second embodiment.
Figure 8B:
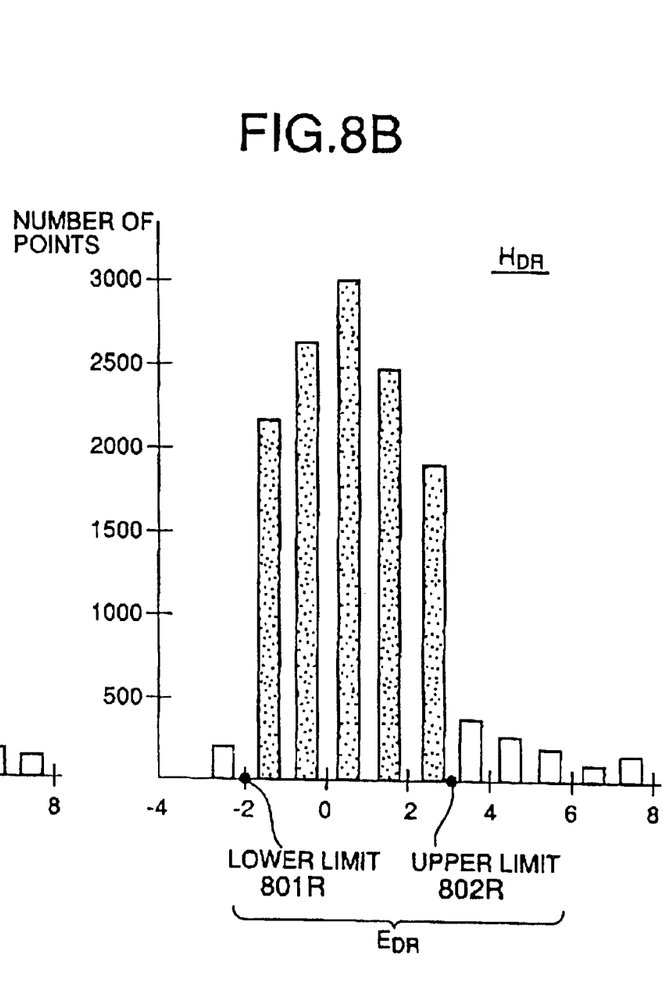
FIG. 8B is a diagram showing a histogram of length variations in the primary and right reference images for explanation of a right-side length variation threshold in the second embodiment.

As shown in FIGS. 8A and 8B, the histogram generator 701 counts the number of points included in each feature segment with respect to the segment length difference $DL_L$ to produce the left histogram $H_{DL}$ and counts the number of points included in each feature segment with respect to the segment length difference $DL_R$ to produce the right histogram $H_{DR}$.

The threshold determination section 702 analyzes the left histogram $H_{DL}$ to search for a range of the segment length difference $DL_L$ where the maximum number of points appear and the number of points is much larger than other ranges. Such a range may be determined by searching for the maximum number of points and comparison with a threshold level.

Referring to FIG. 8A, the range where the number of points is greater than the threshold level (e.g. 1000 or 1500) is sandwiched between two segment length difference values 801L and 802L which are determined as the upper and lower limits. For example, the number of points in a range from –1 to 4 is greater than a threshold level of 1000. Therefore, the threshold determination section 702 generates left threshold data $E_{DL}$ including the upper limit $E_{DL-U}=-1$ and the lower limit $E_{DL-L}=4$.

Referring to FIG. 8B, similarly, the range where the number of points is greater than the threshold level (e.g. 1000 or 1500) is sandwiched between two segment length difference values 801R and 802R which are determined as the upper and lower limits. For example, the number of points in a range of –2 to 3 is greater than a threshold level of 1000. Therefore, the threshold determination section 702 generates right threshold data $E_{DR}$ including the upper limit $E_{DR-U}=-2$ and the lower limit $E_{DR-L}=3$.

Disparity Threshold Determination

Figure 9A:
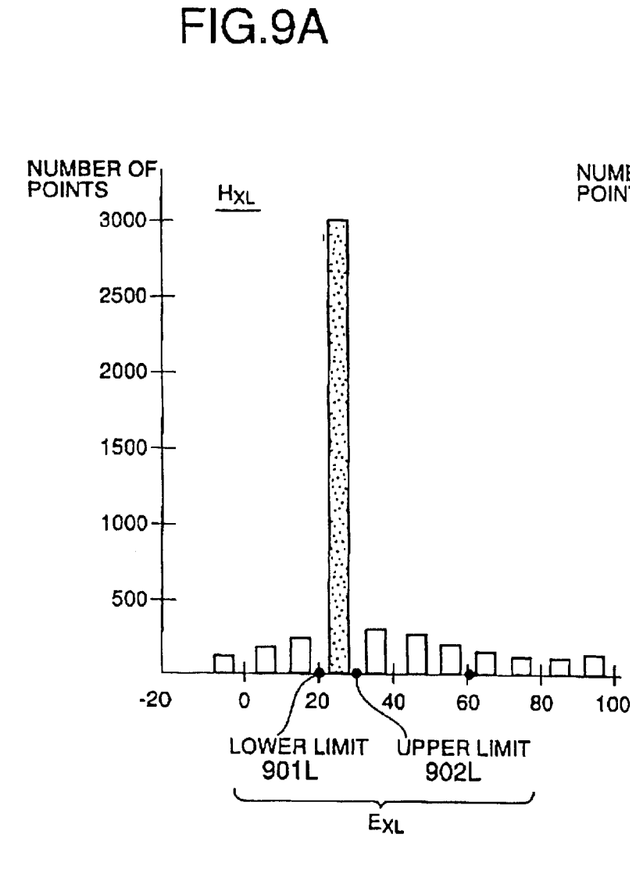
FIG. 9A is a diagram showing a histogram of disparity variations in the primary and left reference images for explanation of a left-side disparity threshold in the second embodiment.
Figure 9B:
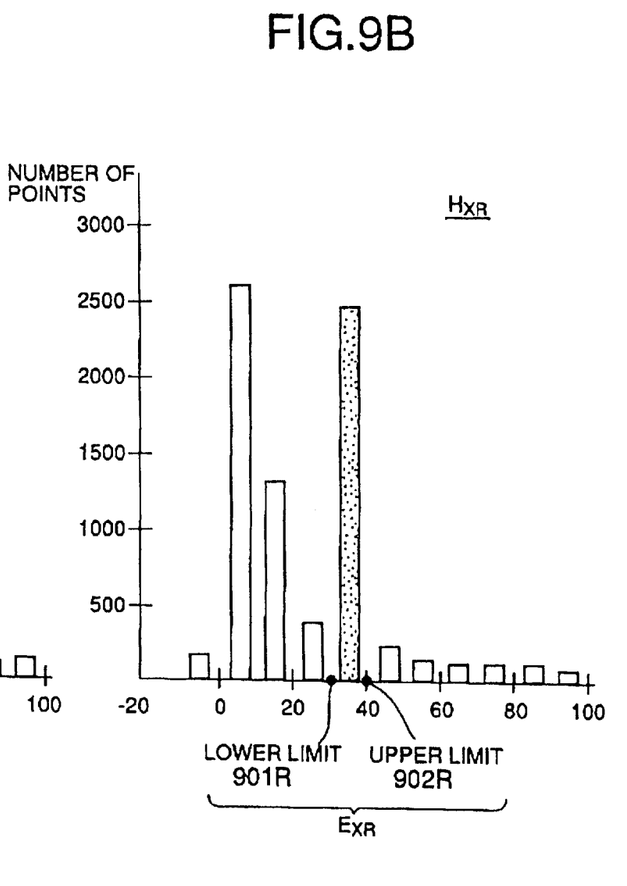
FIG. 9B is a diagram showing a histogram of disparity variations in the primary and right reference images for explanation of a right-side disparity variation threshold in the second embodiment.

As shown in FIGS. 9A and 9B, the disparity histogram generator 704 counts the number of points included in each feature segment with respect to the left disparity $X_L$ to produce the left disparity histogram $H_{XL}$ and counts the number of points included in each feature segment with respect to the right disparity $X_R$ to produce the right disparity histogram $H_{XR}$.

The threshold determination section 705 searches the left disparity histogram $H_{XL}$ for the local maximum number of points and takes two values around the value indicating the local maximum number of points as the upper and lower limits.

Referring to FIG. 9A, the local maximum number of points appears in the range from 20 to 30 which are determined as the upper limit 901L and the lower limit 902L, respectively. Therefore, the threshold determination section 705 generates left disparity threshold data $E_{XL}$ including the upper limit $E_{XL-U}=20$ and the lower limit $E_{XL-L}=30$.

Referring to FIG. 8B, the local maximum number of points appears in the range of 0 to 10 and the range from 30 and 40. In this case, one of the two ranges having the maximum disparity is selected because the closer the object is, the larger the disparity is. In general, in the case where a plurality of ranges having the maximum number of points are found, the threshold determination section 705 selects one of them which has the maximum disparity. In this figure, two values 30 and 40 sandwiching the selected range are determined as the upper limit 901R and the lower limit 902R, respectively.

It should be noted that the above functions may be implemented by software program running on a data processor. In this case, the feature segment extractor 107, the candidate extraction section, the coordinate calculation section, the target object discriminator 112 and the image processor 113 may be implemented with a program-controlled processor using corresponding programs stored in a read-only memory (not shown).

What is claimed is:

1. An object extraction method comprising the steps of:
   a) generating a first image and a plurality of second images through a first image pickup device and a plurality of second image pickup devices, respectively;
   b) extracting a feature region from the first image, the feature region consisting of a plurality of feature segments each defined by a pair of feature points;
   c) extracting a correspondence point candidate of each of the feature points from each of the second images;
   d) calculating three-dimensional coordinates corresponding to the feature points based on the feature points based on the feature points and the correspondence point candidate of each of the feature points for each of the second images; and
   e) extracting the feature region as a target object from the first image based on the feature points and the three-dimensional coordinates corresponding to the feature points for each of the second images, wherein step e) comprises:
      e-1) determining feature point correspondences between the first image and each of the second images using the three-dimensional coordinates for each of the second images;
      e-2) calculating a segment length difference between the first image and each of the second images by using segment correspondence;
      e-3) calculating a disparity of feature points between the first image and each of the second images; and
      e-4) extracting the feature region as the target object from the first image when both the segment length difference and the disparity fall into a predetermined length difference range and a predetermined disparity range, respectively.

2. The object extraction method according to claim 1, wherein the step e-1) comprises the steps of:
   calculating possible distances between counterparts of three-dimensional coordinates over the second images;
   selecting a minimum distance from the possible distances; and
   determining a pair of three-dimensional coordinates providing the minimum distance among point correspondence between the first image and each of the second images.

3. The object extraction method according to claim 1, wherein the step e-4) comprises the steps of:
   generating the predetermined length difference range depending on a first distribution of the number of points included in the feature region with respect to the segment length difference;
   generating the predetermined disparity range depending on a second distribution of the number of points included in the feature region with respect to the disparity; and
   extracting the feature region as the target object from the first image when both the length difference and the disparity fall into the predetermined segment length difference range and the predetermined disparity range, respectively.

4. The object extraction method according to claim 3, wherein the predetermined length difference range is a range where the first distribution is larger than a first predetermined threshold level.

5. The object extraction method according to claim 3, wherein the predetermined disparity range is a range where the second distribution is larger than a second predetermined threshold level.

6. The object extraction method according to claim 5, wherein, when a plurality of ranges where the second distribution is larger than a second predetermined threshold level, a range corresponding to a maximum disparity is determined to be the predetermined disparity range.

7. An object extraction system comprising:
   a first image pickup device for generating a first image of a space;
   a plurality of second image pickup devices for generating second images of the space, respectively;
   a first extractor for extracting a feature region from the first image, the feature region consisting of a plurality of a feature segments each defined by a pair of adjoining feature points;
   a second extractor for extracting a correspondence point candidate of each of the feature points from each of the second images;
   a three-dimensional coordinate calculator for calculating three-dimensional coordinates corresponding to the feature points based on the feature points and the correspondence point candidate of each of the feature points for each of the second images; and
   a third extractor for extracting the feature region as a target object from the first image based on the feature points and the three-dimensional coordinates corresponding to the feature points for each of the second images, wherein the third extractor comprises:
      a correspondence point determiner for determining first and second correspondence points of the feature points using feature point correspondences between the first image and each of the second images;
      a segment length difference calculator for calculating a segment length difference between a first distance calculated between the feature points and a second distance calculated between the first image and each of the second images by using segment correspondence;
      a disparity calculator for calculating a disparity of feature points between the first image and each of the second images; and
      a selector for selecting the feature region as the target object from the first image when both the segment length difference and the disparity fall into a predetermined length difference range and a predetermined disparity range respectively.

8. The object extraction system according to claim 7, wherein the correspondence point determiner calculates possible distance between counterparts of three-dimensional coordinates over the second images, selects a minimum distance from the possible distances, and determines a pair of three-dimensional coordinates providing the minimum distance to be the first and second correspondence points, respectively.

9. An object extraction system comprising:
   a first image pickup device for generating a first image of a space;
   a plurality of second image pickup devices for generating second images of the space, respectively;
   a first extractor for extracting a feature region from the first image, the feature region consisting of a plurality of feature segments each defined by a pair of feature points;

a second extractor for extracting a correspondence point candidate of each of the feature points from each of the second images;

a three-dimensional coordinate calculator for calculating three-dimensional coordinates corresponding to the feature points based on the feature points and the correspondence point candidate of each of the feature points for each of the second images;

a correspondence point determiner for determining first and second correspondence points of the feature points using the three-dimensional coordinates for each of the second images;

a segment length difference calculator for calculating a segment length difference between the first image and each of the second images by using segment correspondence;

e-3) a disparity calculator for calculating a disparity of feature points between the first image and each of the second images;

a first range generator for generating a segment length difference range depending on a first distribution of the number of points included in the feature region with respect to the segment length difference;

a second range generator for generating a disparity range depending on a second distribution of the number of points included in the feature region with respect to the disparity; and a third extractor for selecting the feature region as a target object from the first image when both the segment length difference and the disparity fall into the segment length difference range and a disparity range, respectively.

10. The object extraction system according to claim 9, wherein the first range generator comprises:

a first histogram generator for generating the first distribution; and a first determiner for determining the segment length difference range to be a range where the first distribution is larger than a first predetermined threshold level.

11. The object extraction system according to claim 10, wherein the second range generator comprises:

a second histogram generator for generating the second distribution; and a second determiner for determining the disparity range to be a range where the second distribution is larger than a second predetermined threshold level.

12. The object extraction system according to claim 11, wherein, when a plurality of ranges where the second the second distribution is larger than a second predetermined threshold level, the second range generator determines a range corresponding to a maximum disparity to be the disparity range.

13. A program memory storing a program for performing an object extraction, the program comprising the steps of;

a) storing a first image and a plurality of second images onto image memories, wherein the first image is received from a first image pickup device and the second images is received from a plurality of second image pickup devices, respectively;

b) extracting a feature region from the first image, the feature region consisting of a plurality of feature segments each defined by a pair of adjoining feature points;

c) extracting a correspondence point candidate of each of the feature points from each of the second images;

d) calculating three-dimensional coordinates corresponding to the feature points based on the feature points and the correspondence point candidate of each of the feature points of each of the second images; and e) extracting the feature region as a target object from the first image based on the feature points and the three-dimensional coordinates corresponding to the feature points for each of the second images, wherein step e) comprises:

e-1) determining feature point correspondences between the first image and each of the second images using the three-dimensional coordinates for each of the second images;

e-2) calculating a segment length difference between the first image and each of the second images by using segment correspondence;

e-3) calculating a disparity of feature points between the first image and each of the second images; and e-4) extracting the feature region as the target object from the first image when both the segment length difference and the disparity fall into a segment length difference range and the disparity range, respectively.

14. The program memory according to claim 13, wherein the step e-1) comprises the steps of:

calculating possible distances between counterparts of three-dimensional coordinates over the second images;

selecting a minimum distance from the possible distances; and determining a pair of three-dimensional coordinates providing the minimum distance to be the first and second correspondence points, respectively.

15. The program memory according to claim 13, wherein the step e-4) comprises the steps of:

generating the segment length difference range depending on a first distribution of the number of points included in the feature region with respect to the segment length difference;

generating the disparity range depending on a second distribution of the number of points included in the feature region with respect to the disparity; and extracting the feature region as the target object from the first image when both the segment length difference and the disparity fall into the segment length difference range and the disparity range, respectively.

16. The program memory according to claim 15, wherein the segment length difference range is a range where the first distribution is larger than a first predetermined threshold level, and the disparity range is an range where the second distribution is larger than a second predetermined threshold level.

17. The program memory according to claim 16, wherein, when a plurality of ranges where the second the second distribution is larger than a second predetermined threshold level, a range corresponding to a maximum disparity is determined to be the disparity range.

18. An object extraction method comprising the steps of:

a) generating a first image and a plurality of second images through a first image pickup device and a plurality of second image pickup devices, respectively;

b) extracting a feature region from the first image, the feature region consisting of a plurality of feature segments each defined by a pair of feature points;

c) extracting a correspondence point candidate of each of the feature points from each of the second images;

d) calculating three-dimensional coordinates corresponding to the feature points based on the feature points and the correspondence point candidate of each of the feature points for each of the second images; and
e) extracting the feature region as a target object from the first image based on the feature points and the three-dimensional coordinates corresponding to the feature points for each of the second images, wherein step e) comprises:
   e-1) determining feature point correspondences between the first image and each of the second images using the three-dimensional coordinates for each of the second images;
   e-2) calculating a segment length difference between the first image and each of the second images by using segment correspondence; and
   e-3) extracting the feature region as the target object from the first image when the segment length difference falls into a predetermined length difference range.

* * * * *